(12) United States Patent
Tokunaga et al.

(10) Patent No.: US 7,233,438 B2
(45) Date of Patent: Jun. 19, 2007

(54) SPECIMEN TEMPERATURE ADJUSTING APPARATUS

(75) Inventors: Makio Tokunaga, Mishima (JP); Yoshihiro Ue, Hidaka (JP); Motohiko Suzuki, Kawasaki (JP)

(73) Assignees: Research Organization of Information & Systems, Tokyo (JP); Olympus Corporation, Tokyo (JP)

( * ) Notice: Subject to any disclaimer, the term of this patent is extended or adjusted under 35 U.S.C. 154(b) by 0 days.

(21) Appl. No.: 11/318,900

(22) Filed: Dec. 27, 2005

(65) Prior Publication Data

US 2006/0102850 A1 May 18, 2006

Related U.S. Application Data

(63) Continuation of application No. PCT/JP05/05000, filed on Mar. 18, 2005.

(30) Foreign Application Priority Data

Mar. 29, 2004 (JP) ............... 2004-095449
Mar. 29, 2004 (JP) ............... 2004-095450

(51) Int. Cl.
 *G21K 5/10* (2006.01)
(52) U.S. Cl. ............... 359/395; 250/442.11; 250/443.1; 250/311; 250/310; 324/758; 324/158.1; 324/501; 174/35

(58) Field of Classification Search .................. None
See application file for complete search history.

(56) References Cited

U.S. PATENT DOCUMENTS

| 5,367,171 A | * | 11/1994 | Aoyama et al. | ......... 250/443.1 |
| 6,744,268 B2 | * | 6/2004 | Hollman | ............... 324/758 |
| 7,043,848 B2 | * | 5/2006 | Hollman et al. | .............. 33/556 |
| 2002/0015225 A1 | | 2/2002 | Ue | |

FOREIGN PATENT DOCUMENTS

| JP | 2-88198 U | 7/1990 |
| JP | 2001-83431 A | 3/2001 |
| JP | 2001-305432 A | 10/2001 |
| JP | 2002-98909 A | 4/2002 |
| JP | 2002-196256 A | 7/2002 |
| JP | 2003-050358 A | 2/2003 |

* cited by examiner

*Primary Examiner*—Jack Berman
*Assistant Examiner*—Zia R. Hashmi
(74) *Attorney, Agent, or Firm*—Frishauf, Holtz, Goodman & Chick, P.C.

(57) ABSTRACT

A specimen temperature adjusting apparatus includes a specimen stage that the observation specimen is to be placed on and a temperature adjustment element that is attached to the specimen stage. The specimen stage has a groove surrounding a portion where the observation specimen is to be placed. The temperature adjustment element is located in the groove of the specimen stage.

11 Claims, 11 Drawing Sheets

US 7,233,438 B2

SPECIMEN TEMPERATURE ADJUSTING APPARATUS

CROSS REFERENCE TO RELATED APPLICATIONS

This is a Continuation Application of PCT Application No. PCT/JP2005/005000, filed Mar. 18, 2005, which was published under PCT Article 21(2) in Japanese.

This application is based upon and claims the benefit of priority from prior Japanese Patent Applications No. 2004-095449, filed Mar. 29, 2004; and No. 2004-095450, filed Mar. 29, 2004, the entire contents of both of which are incorporated herein by reference.

BACKGROUND OF THE INVENTION

1. Field of the Invention

The present invention relates to a specimen temperature adjusting apparatus that adjusts the temperature of an observation specimen.

2. Description of the Related Art

In general, specimen observation using a microscope is performed by moving an object lens close to a specimen placed on a microscope stage and magnifying the observation target portion on the specimen. Regarding the objective lens, which is moved close to the specimen, the larger the magnification, the smaller the depth of focus, and the more difficult alignment of the objective lens and observation specimen. Also, even a small change in distance between the objective lens and specimen blurs the observation image. While the apparent positions of the objective lens and observation specimen are very close to each other, the pass-way of their mechanical connection is very long due to the presence of a large number of mechanical components such as a microscope frame, an objective lens moving mechanism, a revolver, and the like. The mechanical components tend to change their sizes depending on a temperature change. During specimen observation, assume that the objective lens has been focused on the observation specimen. Upon the ON/OFF operation of the illumination and the operations of the internal power supply and air-conditioning facilities, when the ambient temperature changes to change the sizes of the mechanical components, the distance between the objective lens and specimen changes. Accordingly, the focal point is shifted readily.

In order to solve this drawback, Jpn. Pat. Appln. KOKAI Publication No. 2001-305432 discloses an apparatus that detects the distance between an objective lens and a specimen stage by a displacement sensor and maintains the distance constant.

Recently, vital specimen observation using a microscope has been performed widely, and a vital specimen must be kept alive on the microscope for a long period of time. In view of this, for example, Jpn. Pat. Appln. KOKAI Publication No. 2003-50358 discloses an apparatus that keeps a vital specimen at a predetermined temperature.

BRIEF SUMMARY OF THE INVENTION

The present invention is a specimen temperature adjusting apparatus for adjusting a temperature of an observation specimen, the specimen temperature adjusting apparatus comprising a specimen stage that the observation specimen is to be placed on, the specimen stage having a groove surrounding a portion where the observation specimen is to be placed, and a temperature adjustment element that is attached to the specimen stage, the temperature adjustment element being located in the groove of the specimen stage.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The embodiments of the present invention will be described with reference to the views of the accompanying drawing.

First Embodiment

Figure 1:
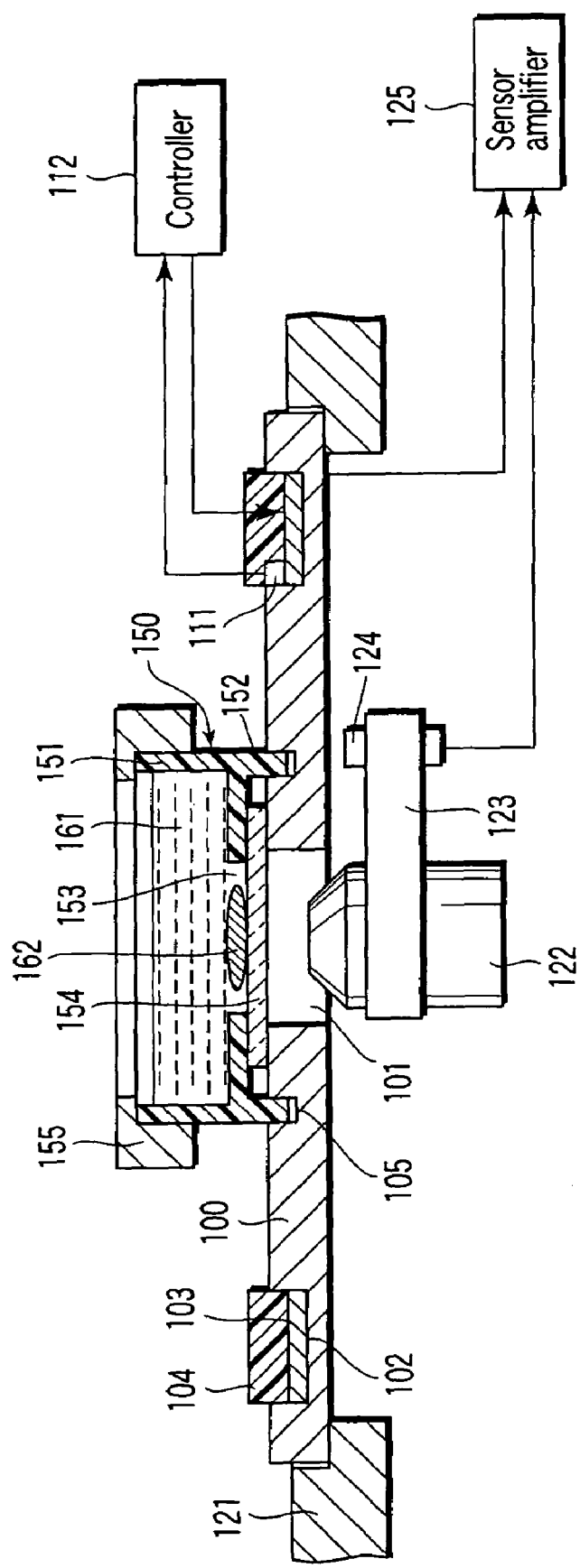
FIG. 1 schematically shows a microscopic apparatus incorporating a specimen temperature adjusting apparatus according to the first embodiment of the present invention.

The first embodiment is directed to an inverted microscopic apparatus incorporating a specimen temperature adjusting apparatus that adjusts the temperature of an observation specimen. FIG. 1 schematically shows the microscopic apparatus according to the first embodiment of the present invention.

As shown in FIG. 1, the specimen temperature adjusting apparatus according to the first embodiment is adapted to the use of a culture container 150 containing an observation specimen 162 and comprises a specimen stage 100 that the culture container 150 containing the observation specimen 162 is to be placed on and a temperature adjustment element 103 that is attached to the specimen stage 100. The specimen stage 100 has a groove 102 surrounding a portion where the culture container 150 containing the observation specimen 162 is to be placed. The temperature adjustment element 103 is located in the groove 102 of the specimen stage 100.

Preferably, the groove 102 continuously surrounds the portion where the culture container 150 is to be placed. More preferably, the groove 102 symmetrically surrounds the portion where the culture container 150 is to be placed. For this purpose, the groove 102 may be a ring-like groove, for example.

The specimen stage 100 preferably comprises a relatively thick disk-like plate. The specimen stage 100 is preferably made of a conductive material having a low thermal expansion coefficient, e.g., Invar.

For example, the temperature adjustment element 103 comprises an element that can heat, e.g., a heater. Alternatively, the temperature adjustment element 103 may comprise an element that can both heat and cool, e.g., a Peltier element.

The temperature adjustment element 103 may comprise a ring-like element, but may be a plurality of elements circularly located in the groove 102 of the specimen stage 100 preferably symmetrically.

The temperature adjustment element 103 is covered with a cover 104. The cover 104 is preferably made of a highly heat-insulating material, e.g., a resin.

The specimen temperature adjusting apparatus further comprises a temperature sensor 111 that measures the temperature of the specimen stage 100 and a temperature controller 112 that controls the temperature adjustment element 103 on the basis of the temperature measured by the temperature sensor 111.

The temperature sensor 111 is located in contact with the temperature adjustment element 103 and covered with the cover 104. The arrangement of the temperature sensor 111 is not limited to this. The temperature sensor 111 may be located near the central portion of the specimen stage 100, i.e., near the portion where the culture container 150 is to be placed.

For example, the temperature controller 112 controls the temperature adjustment element 103 so that the temperature of the specimen stage 100 is kept constant, in other words, so as to keep an output from the temperature sensor 111 constant. Alternatively, the temperature controller 112 controls the temperature adjustment element 103 so that the temperature of the specimen stage 100 changes with a temperature cycle within a temperature range.

The specimen stage 100 has an opening 101 at its central portion and is supported by a microscope stage 121. The opening 101 allows optical observation of the observation specimen 162 from below.

The observation specimen 162 is cultured in a culture solution 161 contained in the culture container 150. The culture container 150 has an opening at the center of the bottom portion of a container main body 151. The opening of the culture container 150 is closed with a glass plate 154 fixed to the lower surface of the bottom portion of the container main body 151. The container main body 151 has a leg 152 projecting more downward than the bottom surface of the glass plate 154. The leg 152 comprises, e.g., a ring-like projection, but is not particularly limited to this, and may comprise a plurality of projections located on a circumference.

The specimen stage 100 further has a recess 105 to receive the leg 152 of the culture container 150. When the leg 152 of the culture container 150 is received in the recess 105, the recess 105 allows the bottom surface of the glass plate 154 of the culture container 150 to be in contact with the specimen stage 100. The recess 105 comprises, e.g., a ring-like groove, but is not limited to this, and suffices as far as it can receive the leg 152 of the culture container 150.

Preferably, a weight 155 is placed on the culture container 150 on the specimen stage 100 to further stabilize the contact of the specimen stage 100 with the glass plate 154 of the culture container 150.

The observation specimen 162 is positioned in the opening at the center of the bottom portion of the container main body 151, and optically observed from below through the glass plate 154.

The microscopic apparatus comprises an objective lens 122 to optically observe the observation specimen 162. The objective lens 122 is positioned below the opening 101 of the specimen stage 100. The objective lens 122 cooperates with an observation optical system (not shown) to optically observe the observation specimen 162 from below through the opening 101 of the specimen stage 100.

The objective lens 122 supports a displacement sensor 124 through a sensor support member 123. The displacement sensor 124 cooperates with the specimen stage 100 to constitute an electrostatic capacitive sensor. Both the displacement sensor 124 and specimen stage 100 are connected to a sensor amplifier 125. The sensor amplifier 125 outputs a signal that reflects the distance from the displacement sensor 124 to the lower surface of the specimen stage 100. The position of the objective lens 122 along the optical axis is preferably controlled on the basis of the output from the sensor amplifier 125. For example, the objective lens 122 is moved along the optical axis so that the distance from the displacement sensor 124 to the lower surface of the specimen stage 100 is kept constant.

The operation of the microscopic apparatus according to this embodiment will be described. In the following description, the temperature adjustment element 103 is exemplified by a heater.

When the power supply of the temperature controller 112 is turned on, the heater 103 generates heat to increase the temperature of the specimen stage 100. As the heater 103 is covered with the cover 104, while the heater 103 generates heat, the culture solution will not wet the heater 103, or the operator's hand will not come into direct contact with the heater 103. As the cover 104 has high heat-insulating properties, the specimen stage 100 is heated efficiently.

The temperature of the heater 103 is detected by the temperature sensor 111 and fed back to the temperature controller 112. On the basis of this signal, the temperature controller 112 adjusts the current to the heater 103 to set the specimen stage 100 to a desired temperature.

Figure 4:
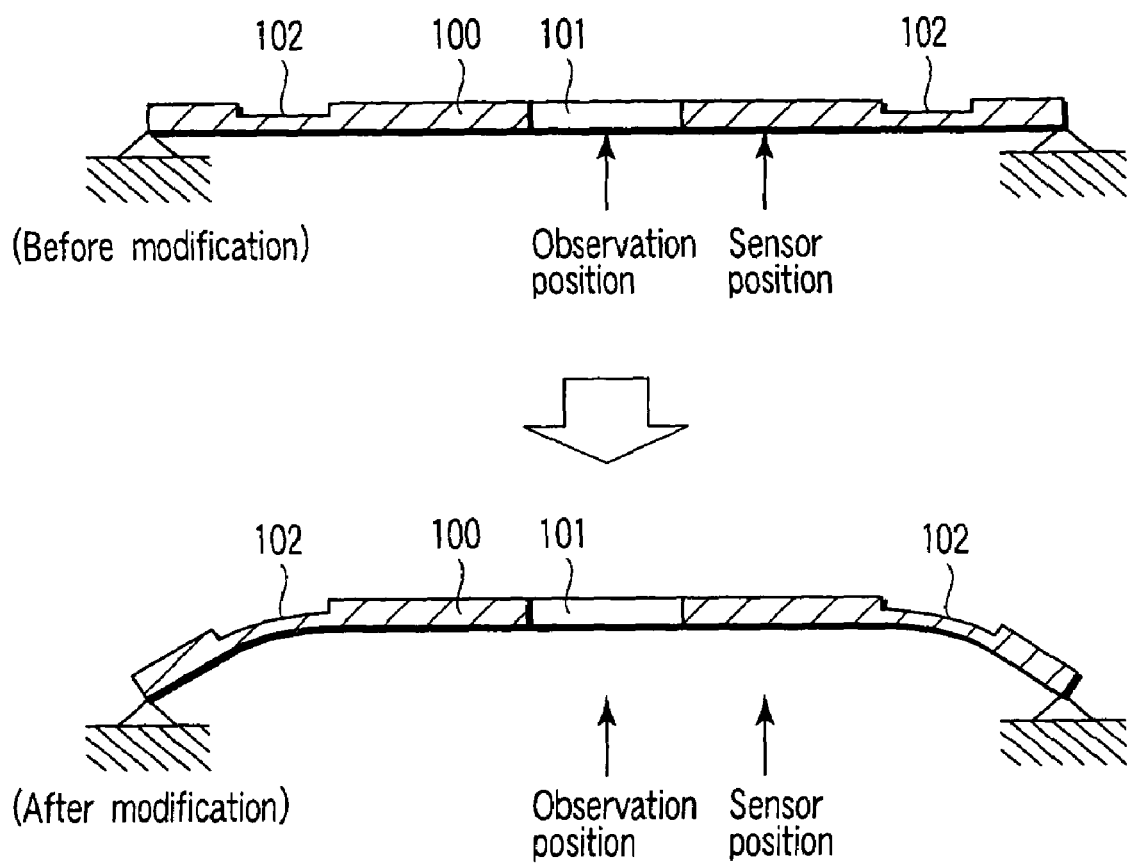
FIG. 4 schematically shows deformation of the specimen stage shown in FIG. 1 caused by heat.

When the temperature of the specimen stage 100 increases, the specimen stage 100 is deformed by the heat. FIG. 4 schematically shows deformation caused by heat of the specimen stage 100. The specimen stage 100 comprises a plate and has the ring-like groove 102 that surrounds the portion where the culture container 150 is to be placed. Thus, as the specimen stage 100 deforms, the portion where the culture container 150 is to be placed moves parallel along the optical axis, as shown in FIG. 4. The displacement of the upper surface and that of the lower surface of the specimen stage 100 are equal.

The portion where the culture container 150 is to be placed includes a portion that opposes the displacement sensor 124, in other words, a target portion of the displacement sensor 124. Accordingly, the displacement along the optical axis of the sensor position as the target of the displacement sensor 124 is equal to the displacement along the optical axis of the observation position positioned on the optical axis. Consequently, the displacement along the optical axis detected by the displacement sensor 124 faithfully reflects the displacement along the optical axis of the observation position.

When the objective lens 122 is moved along the optical axis to keep the output signal from the displacement sensor 124 constant, the positional relationship between the observation specimen 162 and objective lens 122 is kept constant. As a result, occurrence of image blurring is prevented well. As the specimen stage 100 is made of a material having a low thermal expansion coefficient, its thermal deformation upon temperature change is very small. This also contributes to prevention of image blurring.

Figure 5:
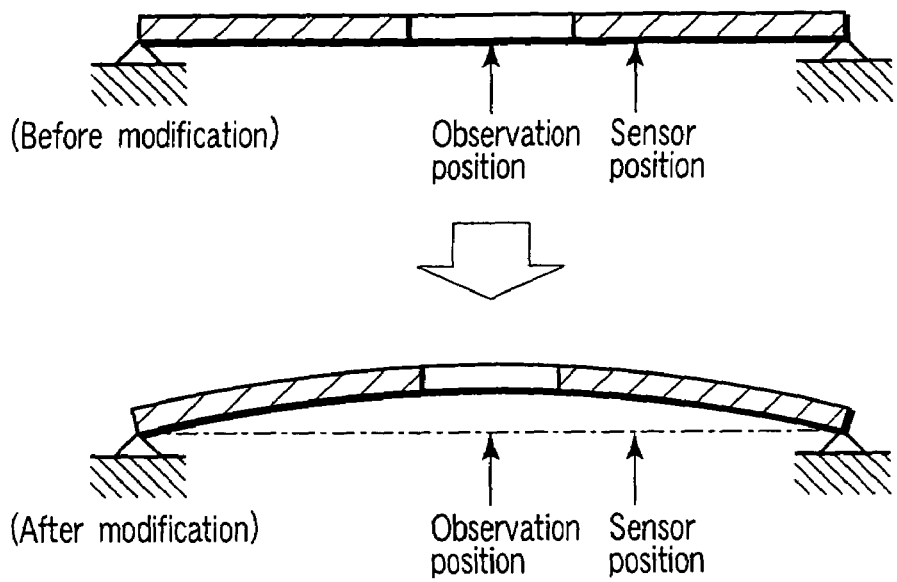
FIG. 5 schematically shows deformation of a specimen stage that has no ring-like groove surrounding a portion where a culture container is to be placed, the deformation is caused by heat.

FIG. 5 schematically shows deformation of a specimen stage caused by heat, and the stage has no ring-like groove to surround a portion where the culture container 150 is to be placed. The closer to the central portion, the larger this specimen stage displaces along the optical axis, as shown in FIG. 5. In other words, the displacement along the optical axis changes depending on the distance from the optical axis. Consequently, the displacement along the optical axis at the sensor position differs from the displacement along the optical axis at the observation position positioned on the optical axis.

Therefore, even when the objective lens is moved along the optical axis to keep constant the displacement detected at the sensor position, the positional relationship between the observation specimen and observation specimen is not kept constant. Consequently, image blurring occurs.

In contrast to this, according to this embodiment, since the displacement at the observation position and that at the sensor position are equal, as described above, the positional relationship between the observation specimen 162 and objective lens 122 can be kept constant. As a result, image blurring can be prevented.

As the specimen stage 100 is heated, heat is conducted from the specimen stage 100 to the culture container 150 through their contact portion, so that the observation specimen 162 is heated. According to this embodiment, the culture container 150 is in contact with the specimen stage 100 at the glass plate 154 as well as at the leg 152. Namely, the contact area of the culture container 150 and specimen stage 100 is enough large. Thus, the observation specimen 162 is heated efficiently.

Furthermore, the weight 155 placed on the culture container 150 increases the contact pressure of the glass plate 154 and specimen stage 100 to decrease contact heat resistance. Consequently, heat is more readily conducted from the specimen stage 100 to the glass plate 154. Accordingly, the insulation effectiveness of the observation specimen 162 is improved.

According to the experiment conducted by the present inventors, with the surrounding ambient temperature and preset heater temperature being equal, when the weight 155 was placed on the culture container 150, the culture solution temperature increased from 37° C. to 38° C.

Figure 6:
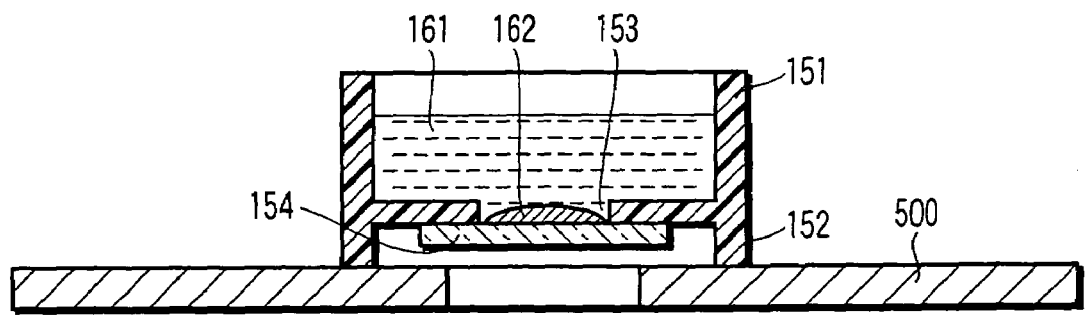
FIG. 6 shows a specimen stage that has no groove to receive the leg of the culture container.

FIG. 6 shows a specimen stage that has no groove to receive the leg 152 of the culture container 150. With this specimen stage, the culture container 150 is in contact with a specimen stage 500 through only the bottom surface of the leg 152, as shown in FIG. 6. Namely, the contact area of the culture container 150 and specimen stage 500 is small. Accordingly, heat transfer efficiency from the specimen stage 500 to the culture container 150 is low.

In contrast to this, according to the present embodiment, the contact area of the culture container 150 and specimen stage 100 is large, as described above, so that the observation specimen 162 can be heated efficiently. In this embodiment, since the heater exemplifies the temperature adjustment element 103, heating is described, but the same discussion applies to cooling as well.

The culture solution 161 in the culture container 150 evaporates and is often replenished during the experiment. As the specimen stage 100 comprises a relatively thick plate, it has relatively high rigidity. Hence, when the culture solution 161 evaporates or is replenished to change its weight, the specimen stage 100 does not substantially deform.

Various changes and modifications may be made in this embodiment without departing from the spirit and scope of the present invention.

For example, in this embodiment, the specimen stage 100 is made of a conductive material. Alternatively, the specimen stage 100 may comprise an insulating plate such as a glass plate and a conductive film formed on the bottom surface of the plate, in which the conductive film is electrically connected to the sensor amplifier 125 through a cable or the like. In this case, since the glass is transparent, an observation window must not be formed at its central portion.

In this embodiment, the culture container 150 containing the observation specimen 162 is placed on the specimen stage 100. Alternatively, a slide glass that the observation specimen 162 is placed on may be placed on the specimen stage 100.

In this embodiment, the groove 102 in which the temperature adjustment element 103 is to be located continuously surrounds the portion where the culture container 150 is to be placed. Alternatively, the groove 102 may discontinuously surrounds the portion where the culture container 150 is to be placed. More specifically, the groove 102 in which the temperature adjustment element 103 is to be located may comprise a plurality of recesses formed around the portion where the culture container 150 is to be placed. In this case, the plurality of recesses are preferably located symmetrically, e.g., equidistantly on a circumference. If a sufficient number of recesses are formed, the same advantage as in this embodiment can be expected.

Second Embodiment

Figure 2:
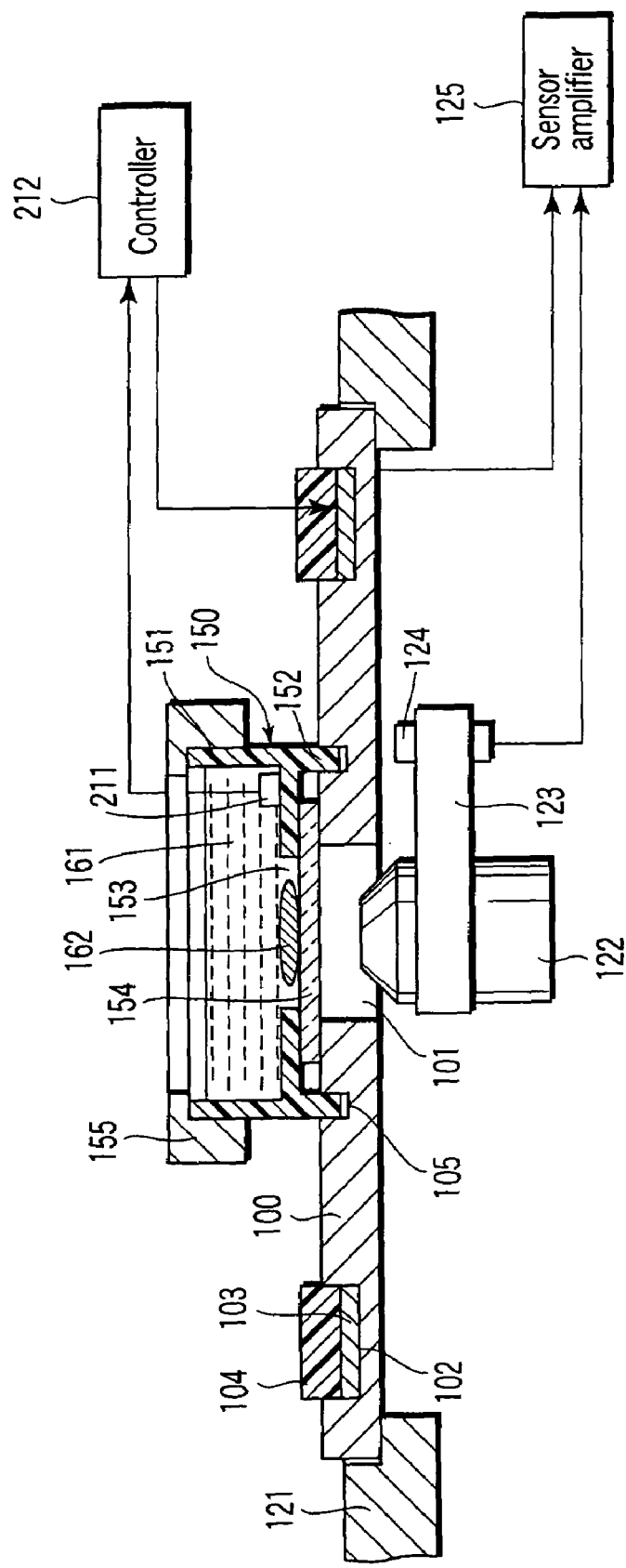
FIG. 2 schematically shows a microscopic apparatus incorporating a specimen temperature adjusting apparatus according to the second embodiment of the present invention.
Figure 3:
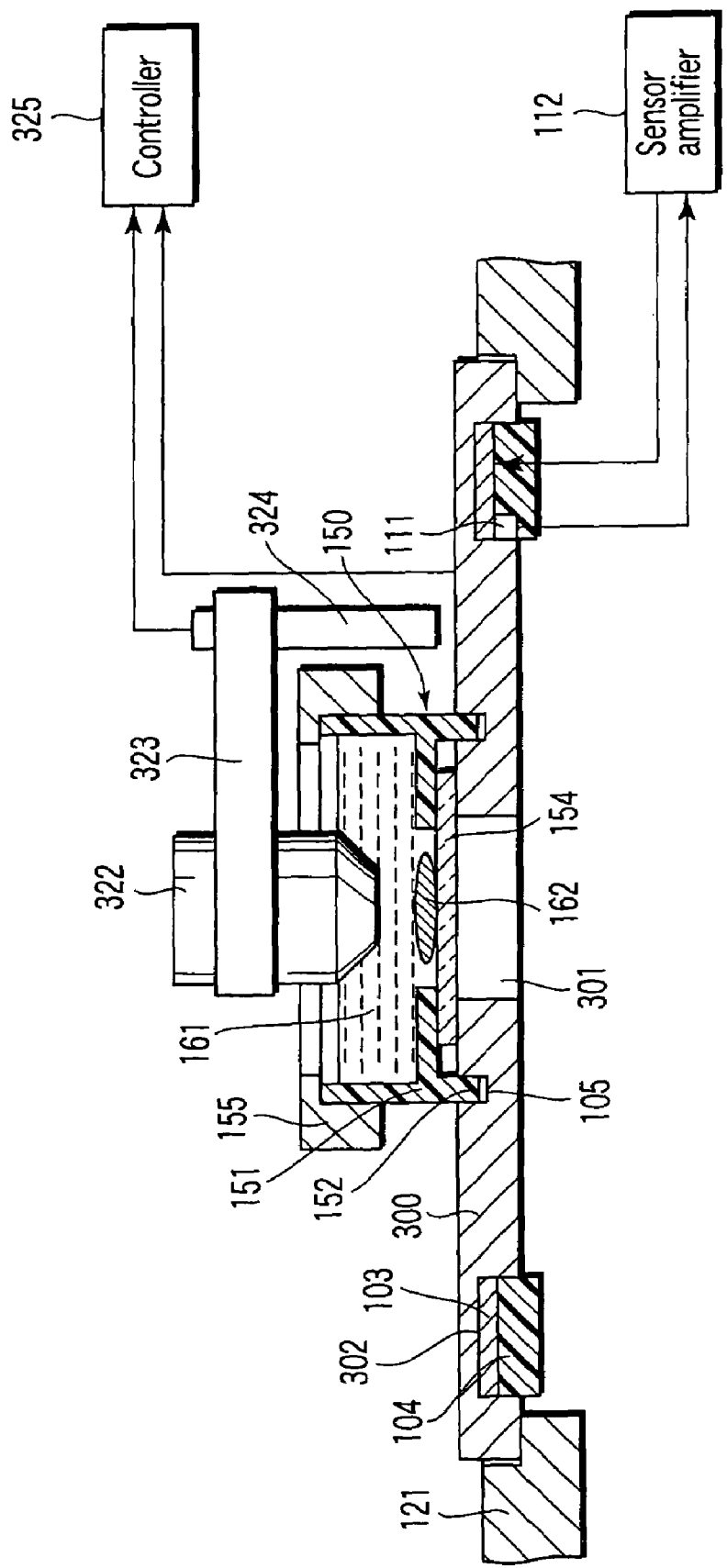
FIG. 3 schematically shows a microscopic apparatus incorporating a specimen temperature adjusting apparatus according to the third embodiment of the present invention.

The second embodiment is directed to deformation of the position where the temperature sensor is located. FIG. 2 schematically shows a microscopic apparatus according to the second embodiment of the present invention. In FIG. 3, members indicated by the same reference numerals as the members shown in FIG. 1 are identical, and a detailed description thereof will be omitted.

As shown in FIG. 2, a specimen temperature adjusting apparatus according to the second embodiment comprises a temperature sensor 211 that measures the temperature of an observation specimen 162 and a temperature controller 212 that controls a temperature adjustment element 103 on the basis of the temperature measured by the temperature sensor 211, in place of the temperature sensor 111 and temperature controller 112 of the first embodiment.

The temperature sensor 211 is located in a culture container 150 and dipped in a culture solution 161. For example, the temperature controller 212 controls the temperature adjustment element 103 so that the temperature of the culture solution 161 is kept constant. In other words, the temperature controller 212 controls the temperature adjustment element 103 to keep an output from the temperature sensor 211 constant. Alternatively, the temperature controller 212 controls the heater 103 so that the temperature of the culture solution 161 changes with a constant temperature cycle.

The arrangement except for the temperature sensor 211 and temperature controller 212 is the same as that of the first embodiment.

The second embodiment has the same advantages as the first embodiment. In particular, in the present embodiment, since temperature control is performed on the basis of the temperature measured by the temperature sensor 211 located in the culture solution 161, the temperature of the observation specimen 162 can be controlled more accurately.

In the second embodiment as well, the same changes and modification as those of the first embodiment may be made.

Third Embodiment

The third embodiment is directed to an upright microscopic apparatus incorporating a specimen temperature adjusting apparatus that adjusts the temperature of an observation specimen. FIG. 3 schematically shows the microscopic apparatus according to the third embodiment of the present invention. In FIG. 3, members indicated by the same reference numerals as the members shown in FIG. 1 are identical, and a detailed description thereof will be omitted.

As shown in FIG. 3, the specimen temperature adjusting apparatus according to the third embodiment comprises a specimen stage 300 in place of the specimen stage 100 of the first embodiment. The specimen stage 300 has a ring-like groove 302 surrounding a portion where a culture container 150 containing an observation specimen 162 is to be placed. A temperature adjustment element 103 is located in the groove 302 of the specimen stage 300. The heater 103 is covered with a cover 104.

The specimen stage 300 preferably comprises a relatively thick disk-like plate like the specimen stage 100. The specimen stage 300 is preferably made of a conductive material having a low thermal expansion coefficient, e.g., Invar. The specimen stage 300 has an opening 301 at its central portion and is supported by a microscope stage 121. The opening 301 allows the observation specimen 162 to be illuminated from below.

The specimen stage 300 further has a recess 105 to receive a leg 152 of the culture container 150. When the leg 152 of the culture container 150 is received in the recess 105, the recess 105 allows the bottom surface of a glass plate 154 of the culture container 150 to be in contact with the specimen stage 300. The recess 105 comprises, e.g., a ring-like groove, but is not limited to this, and suffices as far as it can receive the leg 152 of the culture container 150.

According to this embodiment, the ring-like groove 302 in which the temperature adjustment element 103 is located is formed in the lower surface of the specimen stage 300. The recess 105 that receives the leg 152 of the culture container 150 is formed in the upper surface of the specimen stage 300.

The microscopic apparatus comprises an objective lens 322 to optically observe the observation specimen 162. The objective lens 322 is positioned above the opening 301 of the specimen stage 300 and cooperates with an observation optical system (not shown) to optically observe the observation specimen 162 from above.

The objective lens 322 supports a displacement sensor 324 through a sensor support member 323. The displacement sensor 324 cooperates with the specimen stage 300 to constitute an electrostatic capacitive sensor. Both the displacement sensor 324 and specimen stage 300 are connected to a sensor amplifier 325. The sensor amplifier 325 outputs a signal that reflects the distance from the displacement sensor 324 to the upper surface of the specimen stage 300. The position of the objective lens 322 along the optical axis is preferably controlled on the basis of the output from the sensor amplifier 325. For example, the objective lens 322 is moved along the optical axis so that the distance from the displacement sensor 324 to the upper surface of the specimen stage 300 is kept constant.

The third embodiment is directed to an upright microscopic apparatus. The third embodiment is different from the first embodiment in only that the observation specimen 162 is optically observed from above, and has the same advantage as those of the first embodiment.

In the third embodiment, the same changes and modifications as in the first embodiment may be made.

Fourth Embodiment

The fourth embodiment is directed to a manipulation device for an electric stage in a microscope.

In the microscope, the manipulation of a rotary handle performed by the observer is transmitted through a mechanical transmission mechanism to move the observation specimen in the X-Y direction and to focus on the observation specimen.

Recently, demands for an automatic microscope and fine positioning of an observation specimen and an objective lens increase. Sometimes, electric actuators are used to actuate the focusing mechanism of an objective lens and the X-Y stage. For this reason, a device that converts the rotation angle of the handle into an electric signal has been proposed. Such a device is disclosed in, e.g., Jpn. Pat. Appln. KOKAI Publication No. 2002-182122.

According to the device disclosed in Jpn. Pat. Appln. KOKAI Publication No. 2002-182122, coarse movement and fine movement are switched by a coarse movement/fine movement selection switch, so that coarse movement and fine movement are performed with one handle. Therefore, when manipulating an X-Y stage while observing the observation specimen, in spite that the coarse movement/fine movement selection switch has been set to the coarse movement state, sometimes the observer may erroneously determine that the microscope is set in the fine movement state and manipulate the handle. Then, the observation target falls outside the visual field.

In high-magnification observation using a microscope, vibration should be avoided, and accordingly the microscope is set on an anti-vibration stage for observation. After the observation specimen is set, initial focusing and alignment are performed while looking into the microscope eyepiece lens. After setting is completed or during observation, when the observation position is to be adjusted or the focal position is to be changed, it should be performed from a table separated from the anti-vibration stage, for avoiding adverse affection of vibration during the manipulation to observation.

When observing a vital specimen, fluorescence observation is employed often. Disturbance light should be avoided during fluorescence observation. Thus, for observation, a microscope is set in a darkroom. During the observation or the like, if the observation position or focal position is to be changed, switching between the coarse movement and fine movement is difficult to perform because the interior of the darkroom is dark. In the darkroom, it is dark around the microscope, and accordingly note taking and keyboard operation are difficult to perform. Therefore, the microscope is desirably manipulatable outside the darkroom.

To keep the vital specimen alive for a long period of time, the temperature and humidity must be kept constant. For this purpose, sometimes the microscope is set in a thermostat/humidistat bath for observation. In this case, alignment and focusing of the observation specimen must be manipulated outside the thermostat/humidistat bath by remote control.

This embodiment has been made in view of the above situation, and has as its object to provide a manipulation device that can manipulate an electric stage without performing a switching operation between the coarse movement and fine movement.

Figure 7:
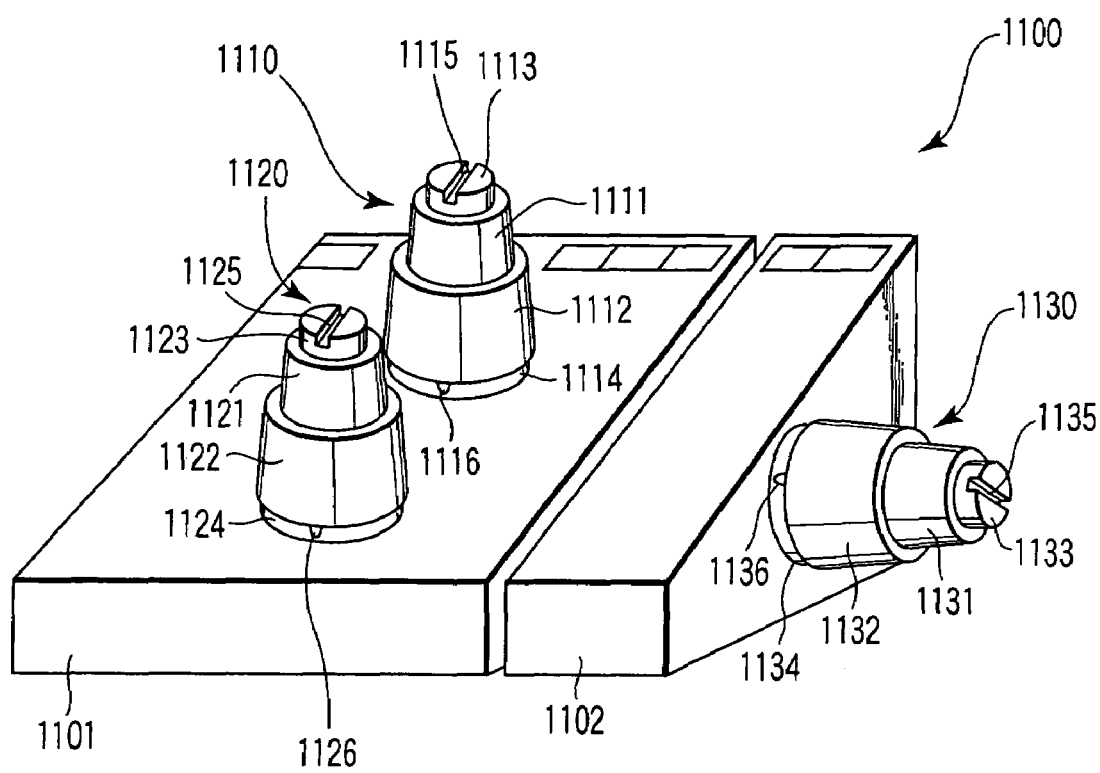
FIG. 7 shows a manipulation device according to the fourth embodiment of the present invention.

FIG. 7 shows a manipulation device according to the fourth embodiment of the present invention.

As shown in FIG. 7, a manipulation device 1100 comprises an X-Y base 1101 and a Z base 1102. The X-Y base 1101 and Z base 1102 are spatially separable. The X-Y base 1101 has an X-movement coaxial handle 1110 and a Y-movement coaxial handle 1120. The Z base 1102 has a Z-movement coaxial handle 1130.

The X-movement coaxial handle 1110 comprises a first rotary knob 1111 and a second rotary knob 1112. The first and second rotary knobs 1111 and 1112 are assigned with X coarse movement and X fine movement. The first and second rotary knobs 1111 and 1112 respectively comprise a rotary resistance adjustment member 1113 and a rotary resistance adjustment member 1114 that adjust rotary resistances. The rotary resistance adjustment member 1113 is provided with a groove 1115. The rotary resistance adjustment member 1114 is provided with a hole 1116.

The Y-movement coaxial handle 1120 comprises a first rotary knob 1121 and a second rotary knob 1122. The first and second rotary knobs 1121 and 1122 are assigned with Y coarse movement and Y fine movement. The first and second rotary knobs 1121 and 1122 respectively comprise a rotary resistance adjustment member 1123 and a rotary resistance adjustment member 1124 that adjust rotary resistances. The rotary resistance adjustment member 1123 is provided with a groove 1125. The rotary resistance adjustment member 1124 is provided with a hole 1126.

The Z-movement coaxial handle 1130 comprises a first rotary knob 1131 and a second rotary knob 1132. The first and second rotary knobs 1131 and 1132 are assigned with Z coarse movement and Z fine movement. The first and second rotary knobs 1131 and 1132 respectively comprise a rotary resistance adjustment member 1133 and rotary resistance adjustment member 1134 that adjust rotary resistances. The rotary resistance adjustment member 1133 is provided with a groove 1135. The rotary resistance adjustment member 1134 is provided with a hole 1136.

Figure 8:
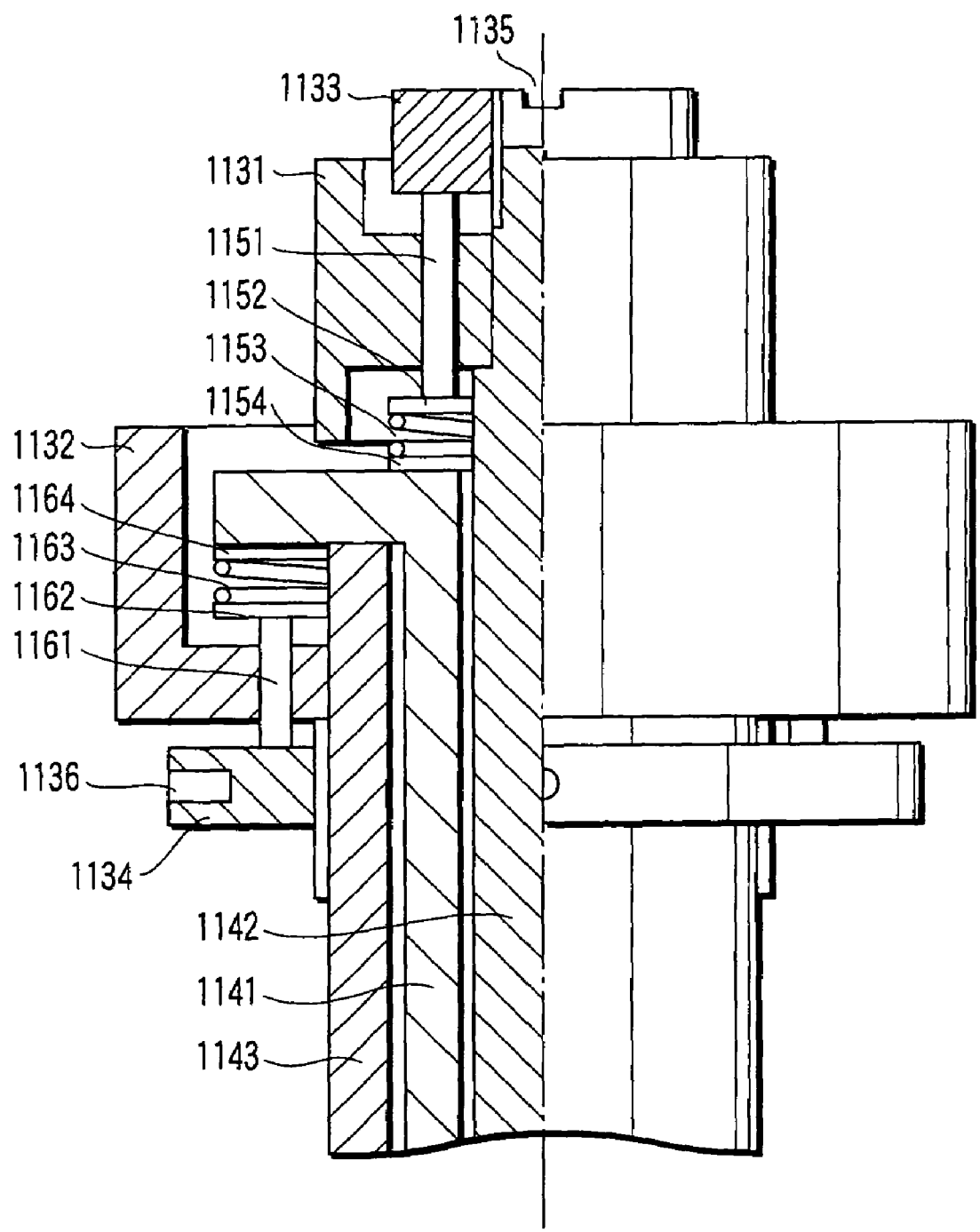
FIG. 8 shows a partial section of the Z-movement coaxial handle shown in FIG. 7.

The X-, Y-, and Z-movement coaxial handles 1110, 1120, and 1130 have the same structure. Accordingly, the rotary resistance adjustment members 1113, 1123, and 1133 have the same structure. Similarly, the rotary resistance adjustment members 1114, 1124, and 1134 have the same structure. In the following description, the rotary resistance adjustment members 1133 and 1134 of the Z-movement coaxial handle 1130 will be described representatively. FIG. 8 shows a partial section of the Z-movement coaxial handle 1130.

As shown in FIG. 8, a rotary shaft 1142 extends inside a stationary shaft 1141, and the rotary shaft 1142 is rotatable with respect to the stationary shaft 1141. The rotary shaft 1142 and first rotary knob 1131 are fixed and rotate integrally. A rotary shaft 1143 extends around the stationary shaft 1141, and the rotary shaft 1143 is rotatable with respect to the stationary shaft 1141. The rotary shaft 1143 and second rotary knob 1132 are fixed and rotate together.

The rotary resistance adjustment member 1133 is screwed into the distal end portion of the rotary shaft 1142. A pin 1151 is arranged in the first rotary knob 1131 and movable parallel to the central shaft of the stationary shaft 1141, i.e., longitudinally movable. One end portion of the pin 1151 is in contact with the rotary resistance adjustment member 1133. A frictional member 1152, a spring 1153, and a frictional member 1154 are located between the other end portion of the pin 1151 and the stationary shaft 1141. Both the frictional members 1152 and 1154 have annular shapes and are positioned around the rotary shaft 1142. The frictional member 1152 is in contact with the pin 1151, and the frictional member 1154 is in contact with the stationary shaft 1141. The spring 1153 is located between the frictional members 1152 and 1154 to apply to them forces that increase the distance between them. For example, the spring 1153 is a coil spring and positioned around the rotary shaft 1142.

As the rotary resistance adjustment member 1133 rotates with respect to the rotary shaft 1142, the rotary resistance adjustment member 1133 moves longitudinally with respect to the rotary shaft 1142. When the rotary resistance adjustment member 1133 moves longitudinally, the pin 1151 moves longitudinally, and accordingly the frictional member 1152 also moves longitudinally. Consequently, the spring 1153 expands or compresses. The expansion and compression of the spring 1153 change the contact pressure of the frictional member 1152 and spring 1153 and the contact pressure of the frictional member 1154 and stationary shaft 1141.

When the first rotary knob 1131 is rotated, the pin 1151 rotates together with it. For example, while holding the first rotary knob 1131, when the first rotary knob 1131 is rotated to move downward, the pin 1151 compresses the spring 1153 through the frictional member 1152. The compression increases the restoration force of the spring 1153. Hence, the contact pressure of the frictional member 1152 and spring 1153 and the contact pressure of the frictional member 1154 and stationary shaft 1141 increase. Consequently, the force required to rotate the first rotary knob 1131 increases to increase the rotary resistance.

The rotary resistance adjustment member 1134 is screwed into the outer surface of the rotary shaft 1143. A pin 1161 is arranged in the second rotary knob 1132 and movable parallel to the central shaft of the stationary shaft 1141, i.e., longitudinally movable. One end portion of the pin 1161 is in contact with the rotary resistance adjustment member 1134. A frictional member 1162, a spring 1163, and a frictional member 1164 are located between the other end portion of the pin 1161 and the stationary shaft 1141. Both the frictional members 1162 and 1164 have annular shapes and are positioned around the rotary shaft 1143. The frictional member 1162 is in contact with the pin 1161, and the frictional member 1164 is in contact with the stationary shaft 1141. The spring 1163 is located between the frictional members 1162 and 1164 to apply to them forces that increase the distance between them. For example, the spring 1163 is a coil spring and positioned around the rotary shaft 1143.

As the rotary resistance adjustment member 1134 rotates, it moves longitudinally with respect to the rotary shaft 1143. Accordingly, the pin 1161 moves longitudinally, and the frictional member 1162 also accordingly moves longitudinally. Consequently, the spring 1163 expands or compresses. The expansion and compression of the spring 1163 change the contact pressure of the frictional member 1162 and spring 1163 and the contact pressure of the frictional member 1164 and stationary shaft 1141. Consequently, the force required to rotate the second rotary knob 1132 changes to change the rotary resistance.

Figure 9:
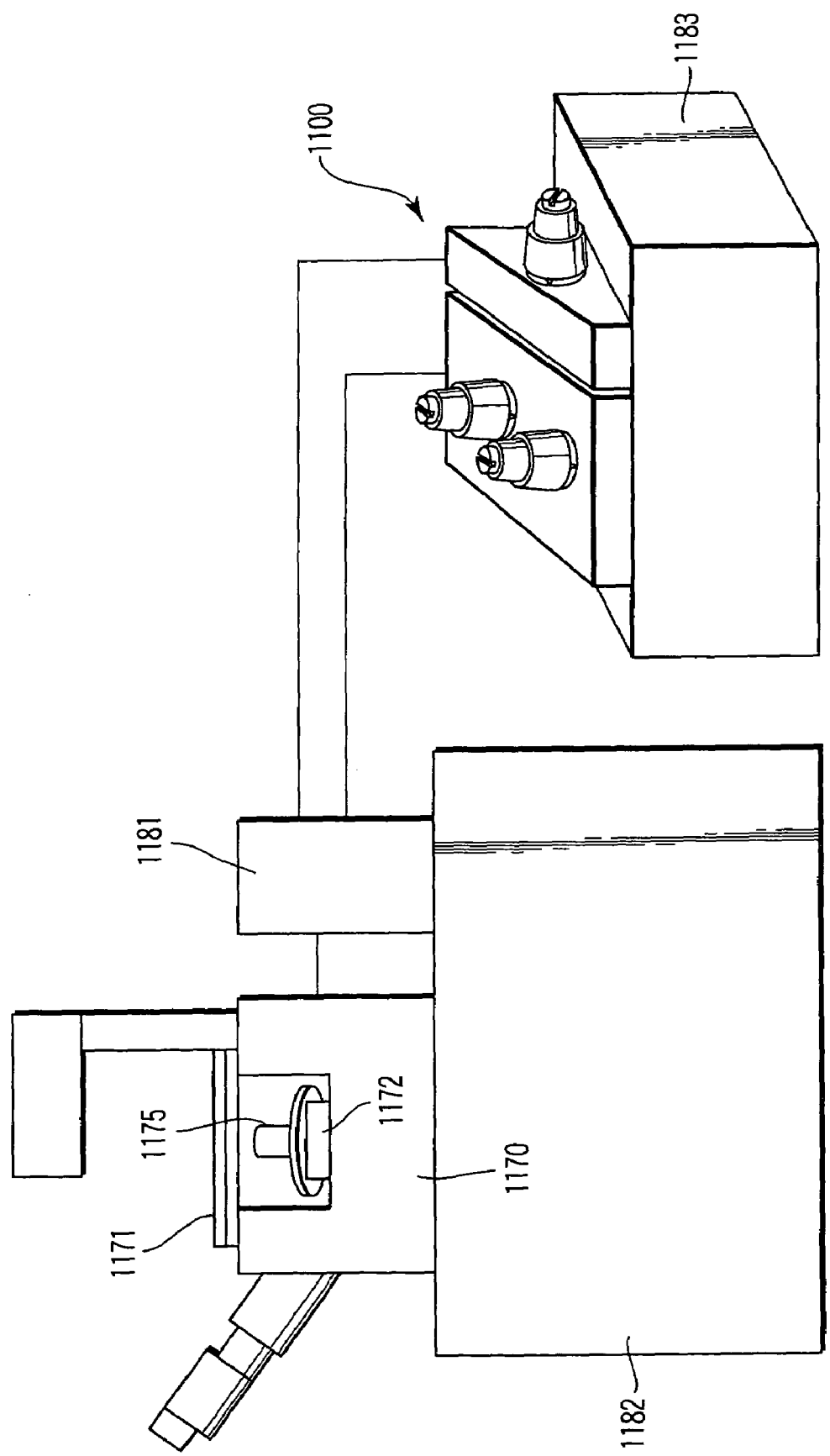
FIG. 9 shows a usage of the manipulation device shown in FIG. 7.

FIG. 9 shows a usage of the manipulation device shown in FIG. 7.

As shown in FIG. 9, a microscope 1170 comprises an X-Y stage 1171 that moves an observation specimen in the X-Y direction and a Z stage 1172 that moves an objective lens 1175 in the Z direction. Both the X-Y stage 1171 and Z stage 1172 comprise electric stages respectively. The microscope 1170 is connected to a manipulation device 1100 through a controller 1181 that drives the X-Y stage 1171 and Z stage 1172. The controller 1181 is connected to the manipulation device 1100 through connection cables. The microscope 1170 is set on an anti-vibration stage 1182. The manipulation device 1100 is located on a table 1183 spatially separate from the anti-vibration stage 1182. Thus, vibration caused by manipulating the manipulation device 1100 does not influence observation.

The operation of the manipulation device 1100 will be described.

When focusing on the observation specimen, the Z-movement coaxial handle 1130 is manipulated. First, the second rotary knob 1132 is rotated to roughly focus on the observation specimen with coarse movement. Subsequently, the first rotary knob 1131 is rotated to focus with fine movement. The Z base 1102 generates an electric signal (manipulation signal) corresponding to the manipulation of the Z-movement coaxial handle 1130. The manipulation signal generated by the Z base 1102 is transmitted to the controller 1181 through the connection cables. On the basis of the transmitted signal, the controller 1181 moves the Z stage 1172. The Z stage 1172 of the microscope 1170 can be manipulated in this manner.

The rotary resistance of the rotary knob (first and second rotary knobs 1131 and 1132) is desirably heavy in coarse movement and light in fine movement. The optimal resistance changes depending on the application and operator, and accordingly the operator may adjust a preferred resistance that matches the application. Rotary resistance adjustment is performed in the following manner. First, assume that the rotary resistance of the first rotary knob 1131 is to be adjusted. While holding the first rotary knob 1131, the operator inserts a coin or the like in the groove 1135 of the rotary resistance adjustment member 1133 and turns the coin or the like, thus adjusting the rotary resistance. Assume that the rotary resistance of the second rotary knob 1132 is to be adjusted. The operator inserts a screwdriver or the like in the hole 1136 of the rotary resistance adjustment member 1134 to fix the rotary resistance adjustment member 1134. Then, the operator rotates the second rotary knob 1132, thus adjusting the rotary resistance. The operator can adjust the rotary resistance arbitrarily in the above manner.

When positioning the observation specimen in the X direction, the X-movement coaxial handle 1110 is manipulated. First, the second rotary knob 1112 is rotated to roughly align the observation specimen in the X direction with coarse movement. Subsequently, the first rotary knob 1111 is rotated to align the observation specimen in the X direction with fine movement. The X-Y base 1101 generates an electric signal (manipulation signal) corresponding to the manipulation of the X-movement coaxial handle 1110. The manipulation signal generated by the X-Y base 1101 is transmitted to the controller 1181 through the connection cables. On the basis of the transmitted signal, the controller 1181 moves the X-Y stage 1171 in the X direction. The X-Y stage 1171 of the microscope 1170 can be manipulated in the X direction in this manner.

The rotary resistance of the rotary knob (first and second rotary knobs 1111 and 1112) is desirably heavy in coarse movement and light in fine movement. The optimal resistance changes depending on the application and operator, and accordingly the operator may adjust a preferred resistance that matches the application. Rotary resistance adjustment is performed in the following manner. First, assume that the rotary resistance of the first rotary knob 1111 is to be adjusted. While holding the first rotary knob 1111, the operator inserts a coin or the like in the groove 1115 of the rotary resistance adjustment member 1113 and turns the coin or the like, thus adjusting the rotary resistance. Assume that the rotary resistance of the second rotary knob 1112 is to be adjusted. The operator inserts a screwdriver or the like in the hole 1116 of the rotary resistance adjustment member 1114 to fix the rotary resistance adjustment member 1114. Then, the operator rotates the second rotary knob 1112, thus adjusting the rotary resistance. The operator can adjust the rotary resistance arbitrarily in the above manner.

When positioning the observation specimen in the Y direction, the Y-movement coaxial handle 1120 is manipulated. First, the second rotary knob 1122 is rotated to roughly align the observation specimen in the Y direction with coarse movement. Subsequently, the first rotary knob 1121 is rotated to align the observation specimen in the Y direction with fine movement. The X-Y base 1101 generates an electric signal (manipulation signal) corresponding to the manipulation of the Y-movement coaxial handle 1120. The manipulation signal generated by the X-Y base 1101 is transmitted to the controller 1181 through the connection cables. On the basis of the transmitted signal, the controller 1181 moves the X-Y stage 1171 in the Y direction. The X-Y stage 1171 of the microscope 1170 can be manipulated in the Y direction in this manner.

The rotary resistance of the rotary knob (first and second rotary knobs 1121 and 1122) is desirably heavy in coarse movement and light in fine movement. The optimal resistance changes depending on the application and operator, and accordingly the operator may adjust a preferred resistance that matches the application. Rotary resistance adjustment is performed in the following manner. First, assume that the rotary resistance of the first rotary knob 1121 is to be adjusted. While holding the first rotary knob 1121, the operator inserts a coin or the like in the groove 1125 of the rotary resistance adjustment member 1123 and turns the coin or the like, thus adjusting the rotary resistance. Assume that the rotary resistance of the second rotary knob 1122 is to be adjusted. The operator inserts a screwdriver or the like in the hole 1126 of the rotary resistance adjustment member 1124 to fix the rotary resistance adjustment member 1124. Then, the operator rotates the second rotary knob 1122, thus adjusting the rotary resistance. The operator can adjust the rotary resistance arbitrarily in the above manner.

In the above manner, the X-Y and Z stages 1171 and 1172 of the microscope 1170 can be manipulated on the table 1183 that is spatially separate from the anti-vibration stage 1182 where the microscope 1170 is set. Namely, the X-Y and Z stages 1171 and 1172 of the microscope 1170 can be manipulated without transmitting to the microscope 1170 vibration caused by manipulating the manipulation device 1100.

If the X-Y stage 1171 need not be manipulated in observation, the X-Y base 1101 can be removed from the controller 1181. Then, a wide space can be reserved around the observer's hands.

As the X-Y and Z bases 1101 and 1102 are separable, the operator can arrange them at appropriate convenient positions and use them in accordance with the usage.

The controller 1181 can be connected to a plurality of X-Y bases 1101 and a plurality of Z bases 1102. When the controller 1181 is connected to the plurality of X-Y bases 1101 and the plurality of Z bases 1102 and the plurality of X-Y bases 1101 and the plurality of Z bases 1102 are located at different positions, the microscope can be manipulated from different positions.

Each of the X-Y base 1101 and Z base 1102 has several switches. These switches include a position lock switch, a position memory switch, and a position memory position restoration switch. With the position lock switch being turned on, after focusing or positioning is completed, even if the operator erroneously touches a rotary knob, the rotary knob will not move. With the position memory switch and position memory position restoration switch being turned on, even if the operator should erroneously touch a rotary knob, the rotary knob can be restored to the initial position.

The upper surface of the X-Y base 1101 is inclined. Therefore, the observer who places his or her elbows on the table can place his or her hands on the upper surface of the X-Y base 1101 easily. This reduces the fatigue the operator suffers from long-time manipulation.

As the X- and Y-movement coaxial handles 1110 and 1120 provided to the X-Y base 1101 are arrayed longitudinally, their rotary knobs can be manipulated with either the left or right hand. The arrangement of the X- and Y-movement coaxial handles 1110 and 1120 is not limited to a longitudinal array, but can be a transverse array.

The Z-movement coaxial handle 1130 is arranged on the right side surface to extend horizontally, but its position is not limited to this. The Z-movement coaxial handle 1130 may be provided on the left side surface to extend horizontally, or on the upper surface to extend upward.

The four rotary knobs 1111, 1112, 1121, and 1122 may be arbitrarily assigned with the functions of X coarse movement, X fine movement, Y coarse movement, and Y fine movement. More specifically, while the rotary knobs 1111 and 1112 are assigned with X coarse movement and X fine movement in this embodiment, they may be respectively assigned with X fine movement and X coarse movement. Similarly, while the rotary knobs 1121 and 1122 are respectively assigned with Y coarse movement and Y fine movement, they may be respectively assigned with Y fine movement and Y coarse movement.

In this embodiment, the coaxial handle 1110 is assigned with X coarse movement and X fine movement, and the coaxial handle 1120 is assigned with Y coarse movement and Y fine movement. Alternatively, the coaxial handle 1110 may be assigned with Y coarse movement and Y fine movement, and the coaxial handle 1120 may be assigned with X coarse movement and X fine movement. In this case, naturally, assignment of Y coarse movement and that of Y fine movement to the rotary knobs 1111 and 1112 of the coaxial handle 1110 are arbitrarily interchangeable. Similarly, assignment of X coarse movement and that of X fine movement to the rotary knobs 1121 and 1122 of the coaxial handle 1120 are arbitrarily interchangeable.

Fifth Embodiment

Figure 10:
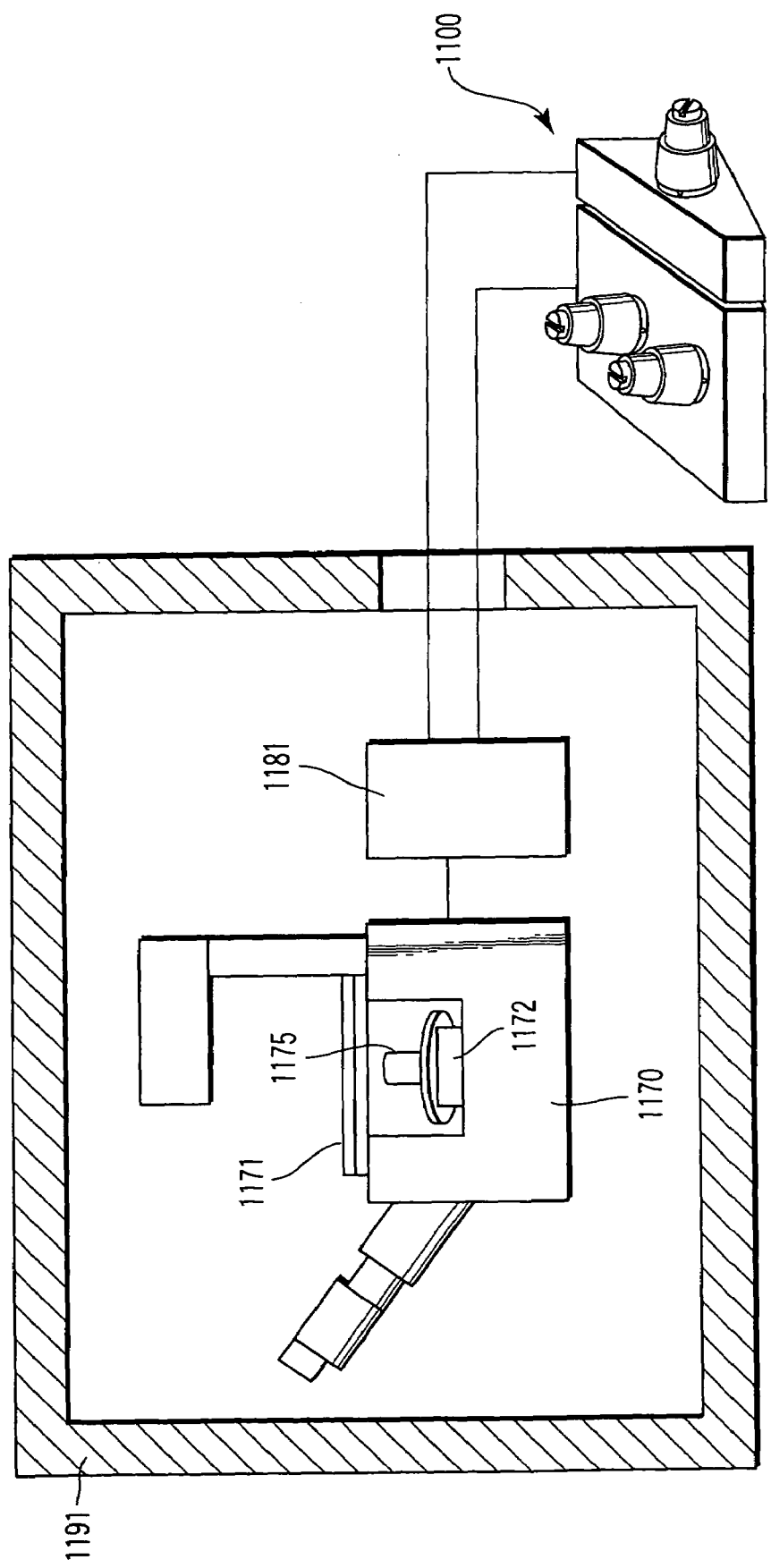
FIG. 10 shows a usage of the manipulation device shown in FIG. 7 according to the fifth embodiment.

The fifth embodiment is directed to another usage of the manipulation device described in the fourth embodiment. FIG. 10 shows a usage of the manipulation device shown in FIG. 7 according to the fifth embodiment. In FIG. 10, members indicated by the same reference numerals as the members shown in FIG. 9 are identical, and a detailed description thereof will be omitted.

As shown in FIG. 10, a microscope 1170 is set in a thermostat/humidistat bath 1191 together with a controller 1181 that drives an X-Y stage 1171 and a Z stage 1172. A manipulation device 1100 is located outside the thermostat/humidistat bath 1191 that shields light and radio waves. The controller 1181 is connected to the manipulation device 1100 through connection cables.

The manipulation device 1100 of this embodiment is manipulated in the same manner as the manipulation device 1100 of the fourth embodiment. More specifically, when focusing on an observation specimen, a Z-movement coaxial handle 1130 is manipulated. First, a second rotary knob 1132 is rotated to roughly focus on the observation specimen with coarse movement. Subsequently, a first rotary knob 1131 is rotated to focus with fine movement. A manipulation signal generated by manipulating the Z-movement coaxial handle 1130 is transmitted through the connection cables to the controller 1181 placed in the thermostat/humidistat bath 1191. On the basis of the transmitted signal, the controller 1181 operates the Z stage 1172. The Z stage 1172 of the microscope 1170 can be manipulated in this manner.

When positioning the observation specimen in the X direction, an X-movement coaxial handle 1110 is manipulated. First, a second rotary knob 1112 is rotated to roughly align the observation specimen in the X direction with coarse movement. Subsequently, a first rotary knob 1111 is rotated to align the observation specimen in the X direction with fine movement. A manipulation signal generated by manipulating the X-movement coaxial handle 1110 is transmitted through the connection cables to the controller 1181 placed in the thermostat/humidistat bath 1191. On the basis of the transmitted signal, the controller 1181 operates the X stage. The X-Y stage 1171 of the microscope 1170 can be manipulated in the X direction in this manner.

When positioning the observation specimen in the Y direction, a Y-movement coaxial handle 1120 is manipulated. First, a second rotary knob 1122 is rotated to roughly align the observation specimen in the Y direction with coarse movement. Subsequently, a first rotary knob 1121 is rotated to align the observation specimen in the Y direction with fine movement. A manipulation signal generated by manipulating the Y-movement coaxial handle 1120 is transmitted through the connection cables to the controller 1181 placed in the thermostat/humidistat bath 1191. On the basis of the transmitted signal, the controller 1181 operates the X-Y stage 1171 and Z stage 1172. The X-Y stage 1171 of the microscope 1170 can be manipulated in the Y direction in this manner.

According to this embodiment, the X-Y stage 1171 and Z stage 1172 of the microscope 1170 in the thermostat/humidistat bath 1191 can be manipulated by the manipulation device 1100 located outside the thermostat/humidistat bath 1191 that shields light and electric waves, from outside the thermostat/humidistat bath 1191 by remote control.

Sixth Embodiment

Figure 11:
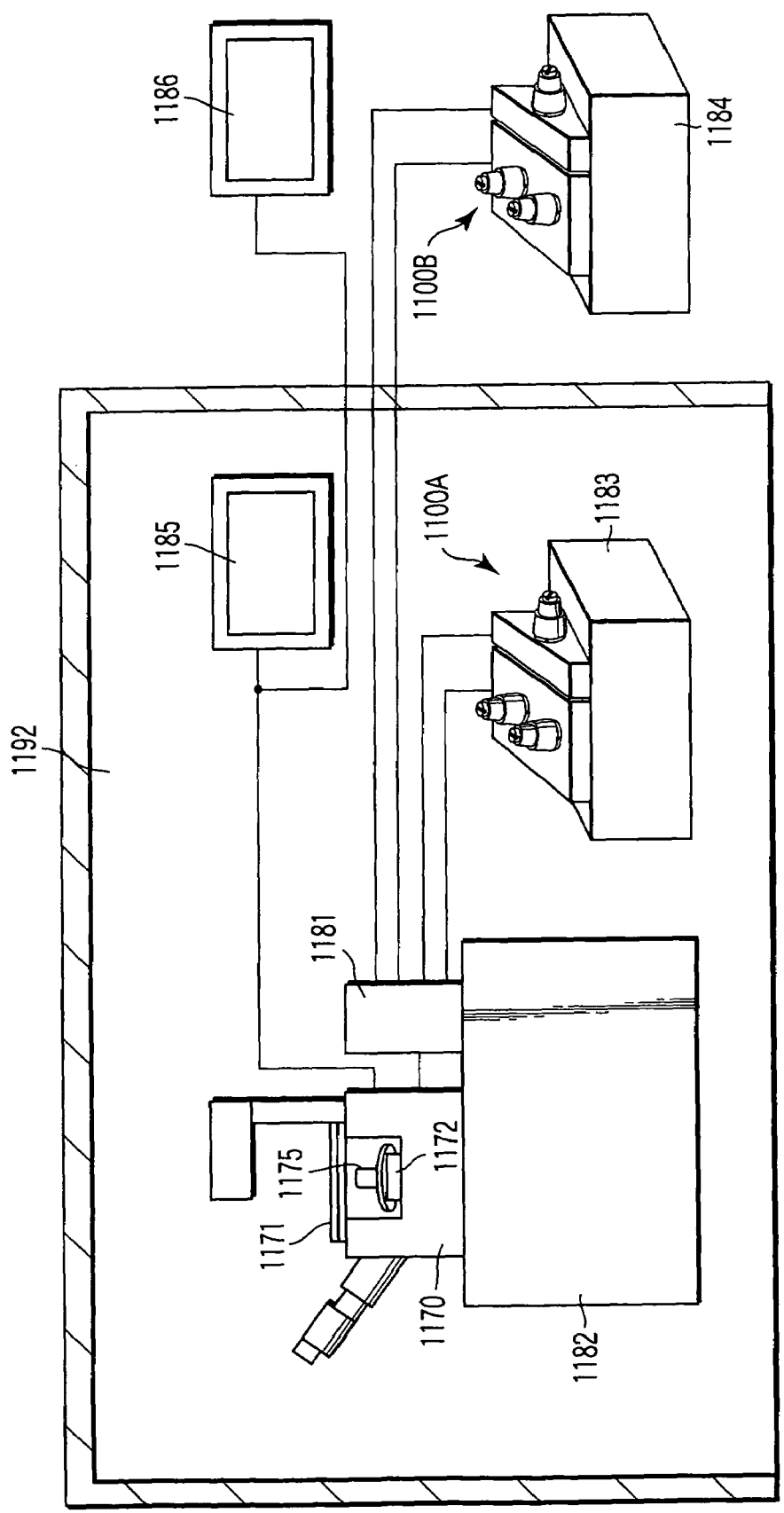
FIG. 11 shows a usage of the manipulation device shown in FIG. 7 according to the sixth embodiment.

The sixth embodiment is directed to still another usage of the manipulation device described in the fourth embodiment. FIG. 11 shows a usage of the manipulation device shown in FIG. 7 according to the sixth embodiment. In FIG. 11, members indicated by the same reference numerals as the members shown in FIG. 9 are identical, and a detailed description thereof will be omitted.

As shown in FIG. 11, a microscope 1170 is set in a darkroom 1192 together with a controller 1181 that drives an X-Y stage 1171 and a Z stage 1172. The microscope 1170 and controller 1181 are set on an anti-vibration stage 1182. The controller 1181 is connected to two manipulation devices 1100A and 1100B through connection cables. The manipulation devices 1100A and 1100B are identical with the manipulation device 1100 described in the fourth embodiment, and their practical manipulation is also identical to that described in the fourth embodiment.

One manipulation device 1100A is in the darkroom 1192 and placed on a table 1183. The other manipulation device 1100B is outside the darkroom 1192 and placed on a table 1184. Furthermore, the microscope 1170 is connected to two observation monitors 1185 and 1186 through connection cables. One observation monitor 1185 is located in the darkroom 1192, and the other observation monitor 1186 is located outside the darkroom 1192.

According to this embodiment, the X-Y stage 1171 and Z stage 1172 of the microscope 1170 can be driven by using either one of the manipulation devices 1100A and 1100B. In particular, assume that the microscope 1170 is set in a dark environment as in, e.g., fluorescence observation. In this case, when the manipulation device 1100B and observation monitor 1186 that are located outside the darkroom 1192 are used, manipulation such as a change of the observation position or focal position can be performed outside the darkroom 1192. The outside of the darkroom 1192 is bright, or can be lightened if it is dark. Hence, switching between coarse movement and fine movement can be performed easily. Also, note taking and keyboard operation can be performed easily.

When focusing on an observation specimen, a Z-movement coaxial handle 1130 is manipulated. First, a second rotary knob 1132 is rotated to roughly focus on the observation specimen with coarse movement. Subsequently, a first rotary knob 1131 is rotated to focus with fine movement. A manipulation signal generated by manipulating the Z-movement coaxial handle 1130 is transmitted through the connection cables to the controller 1181 placed in the darkroom 1192. On the basis of the transmitted signal, the controller 1181 operates the Z stage 1172. The Z stage 1172 of the microscope 1170 in the darkroom 1192 can be manipulated in this manner by remote control.

When positioning the observation specimen in the X direction, an X-movement coaxial handle 1110 is manipulated. First, a second rotary knob 1112 is rotated to roughly align the observation specimen in the X direction with coarse movement. Subsequently, a first rotary knob 1111 is rotated to align the observation specimen in the X direction with fine movement. A manipulation signal generated by manipulating the X-movement coaxial handle 1110 is transmitted through the connection cables to the controller 1181 placed in the darkroom 1192. On the basis of the transmitted signal, the controller 1181 operates the X stage.

When positioning the observation specimen in the Y direction, a Y-movement coaxial handle 1120 is manipulated. First, a second rotary knob 1122 is rotated to roughly align the observation specimen in the Y direction with coarse movement. Subsequently, a first rotary knob 1121 is rotated to align the observation specimen in the Y direction with fine movement. A manipulation signal generated by manipulating the Y-movement coaxial handle 1120 is transmitted through the connection cables to the controller 1181 placed in the darkroom 1192. On the basis of the transmitted signal, the controller 1181 operates the X-Y stage 1171 and Z stage 1172.

According to this embodiment, the X-Y stage 1171 and Z stage 1172 of the microscope 1170 in the darkroom can be manipulated at an arbitrary position in or outside the darkroom by remote control.

Seventh Embodiment

Figure 12:
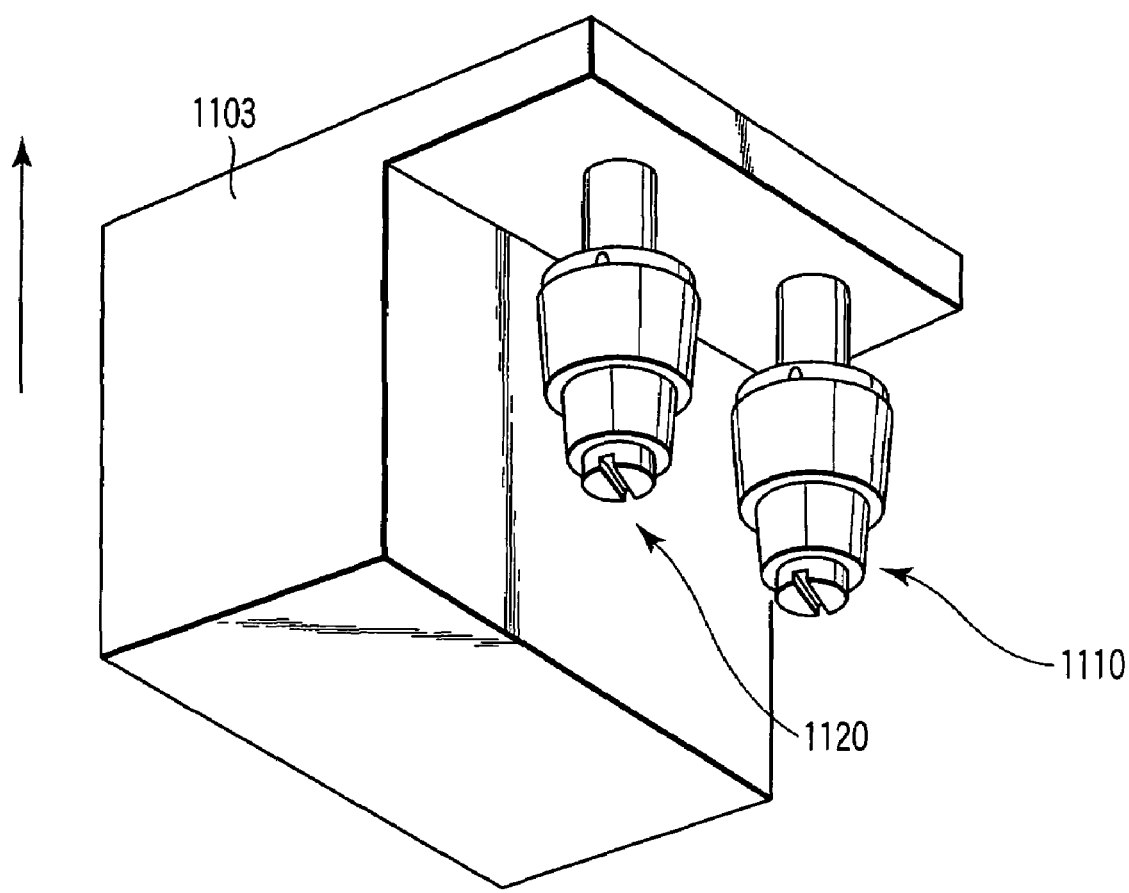
FIG. 12 shows an X-Y base according to the sixth embodiment of the present invention.

This embodiment is directed to a modification of the X-Y base described in the fourth embodiment. FIG. 12 shows the X-Y base according to the fourth embodiment of the present invention.

As shown in FIG. 12, an X-Y base 1103 comprises an X-movement coaxial handle 1110 and a Y-movement coaxial handle 1120. The X-movement coaxial handle 1110 and Y-movement coaxial handle 1120 have been described in detail in the fourth embodiment, and a detailed description thereof will be omitted.

In this embodiment, the X-movement coaxial handle 1110 and Y-movement coaxial handle 1120 are provided to the lower surface of the X-Y base 1103 to face downward. Namely, the X-movement coaxial handle 1110 and Y-movement coaxial handle 1120 extend toward below.

The X-Y base 1103 has a flat upper surface and can be attached to, e.g., the lower surface of a table. When the X-Y base 1103 is attached to the lower surface of a table, the operator can manipulate an X-Y stage 1171 and a Z stage 1172 with his hands on the table. This reduces the fatigue the operator suffers from long-time manipulation.

So far the embodiments of the present invention have been described with reference to the views of the accompanying drawing. Note that the present invention is not limited to these embodiments, but various changes and modifications may be made without departing from the spirit and scope of the present invention.

What is claimed is:

1. A specimen temperature adjusting apparatus that adjusts a temperature of an observation specimen contained in a culture container having a leg and a transparent member at a bottom of the culture container, said specimen temperature adjusting apparatus comprising:

a specimen stage on which the culture container containing the observation specimen is to be placed, the specimen stage having a groove surrounding a portion where the culture container containing the observation specimen is to be placed, and the specimen stage further having a recess to receive the leg of the culture container such that a bottom surface of the transparent member at the bottom of the culture container contacts the specimen stage when the culture container is placed on the specimen stage; and a temperature adjustment element that is attached to the specimen stage, the temperature adjustment element being located in the groove of the specimen stage.

2. A specimen temperature adjusting apparatus according to claim 1, wherein the transparent member comprises a glass plate.

3. A specimen temperature adjusting apparatus according to claim 1, wherein the temperature adjustment element comprises a heater.

4. A specimen temperature adjusting apparatus according to claim 1, wherein the temperature adjustment element is configured to perform heating and cooling.

5. A specimen temperature adjusting apparatus according to claim 4, wherein the temperature adjustment element comprises a Peltier element.

6. A specimen temperature adjusting apparatus according to claim 1, further comprising a temperature sensor that measures a temperature of at least one of the observation specimen and the specimen stage, and a temperature controller that controls the temperature adjustment element based on the temperature measured by the temperature sensor.

7. A manipulation device to manipulate an electric stage comprising:
   a base member; and
   an X-movement coaxial handle, a Y-movement coaxial handle, and a Z-movement coaxial handle provided on the base member,
   wherein the X-movement coaxial handle is assigned with X coarse movement and X fine movement, the Y-movement coaxial handle is assigned with Y coarse movement and Y fine movement, and the Z-movement coaxial handle is assigned with Z coarse movement and Z fine movement, and wherein each of the X-, Y- and Z-movement coaxial handles comprises first and second rotary knobs,
   wherein the base member is shaped such that an observer who places his or her elbows on a table on which the manipulation device is provided can manipulate the first and second rotary knobs of each of at least the X- and Y-movement coaxial handles with either a left or right hand.

8. A manipulation device according to claim 7, wherein each of the X-, Y-, and Z-movement coaxial handles includes a rotary resistance adjustment member.

9. A manipulation device according to claim 7, wherein the base member includes an X-Y base member and a Z base member which are spatially separated, and wherein the X-movement coaxial handle and the Y-movement coaxial handle are provided on the X-Y base member, and the Z-movement coaxial handle is provided on the Z base member.

10. A manipulation device according to claim 7, wherein the base member comprises an inclined upper surface and at least the X- and Y-movement coaxial handles are provided on the inclined upper surface of the base member.

11. A manipulation device according to claim 10, wherein the X- and Y-movement coaxial handles are longitudinally arranged on the inclined upper surface of the base member.

* * * * *